Figure 1:
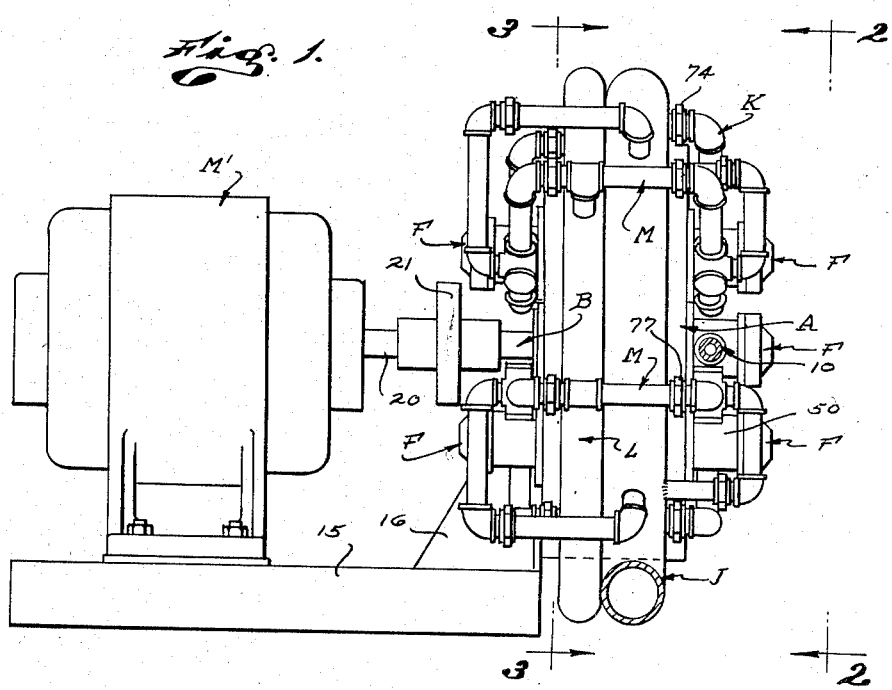

Jan. 18, 1955    O. T. QUINN    2,699,726
POWER DRIVE FOR PUMPS
Filed April 23, 1952    3 Sheets-Sheet 1

INVENTOR.
Orion T. Quinn
BY
    Attorney

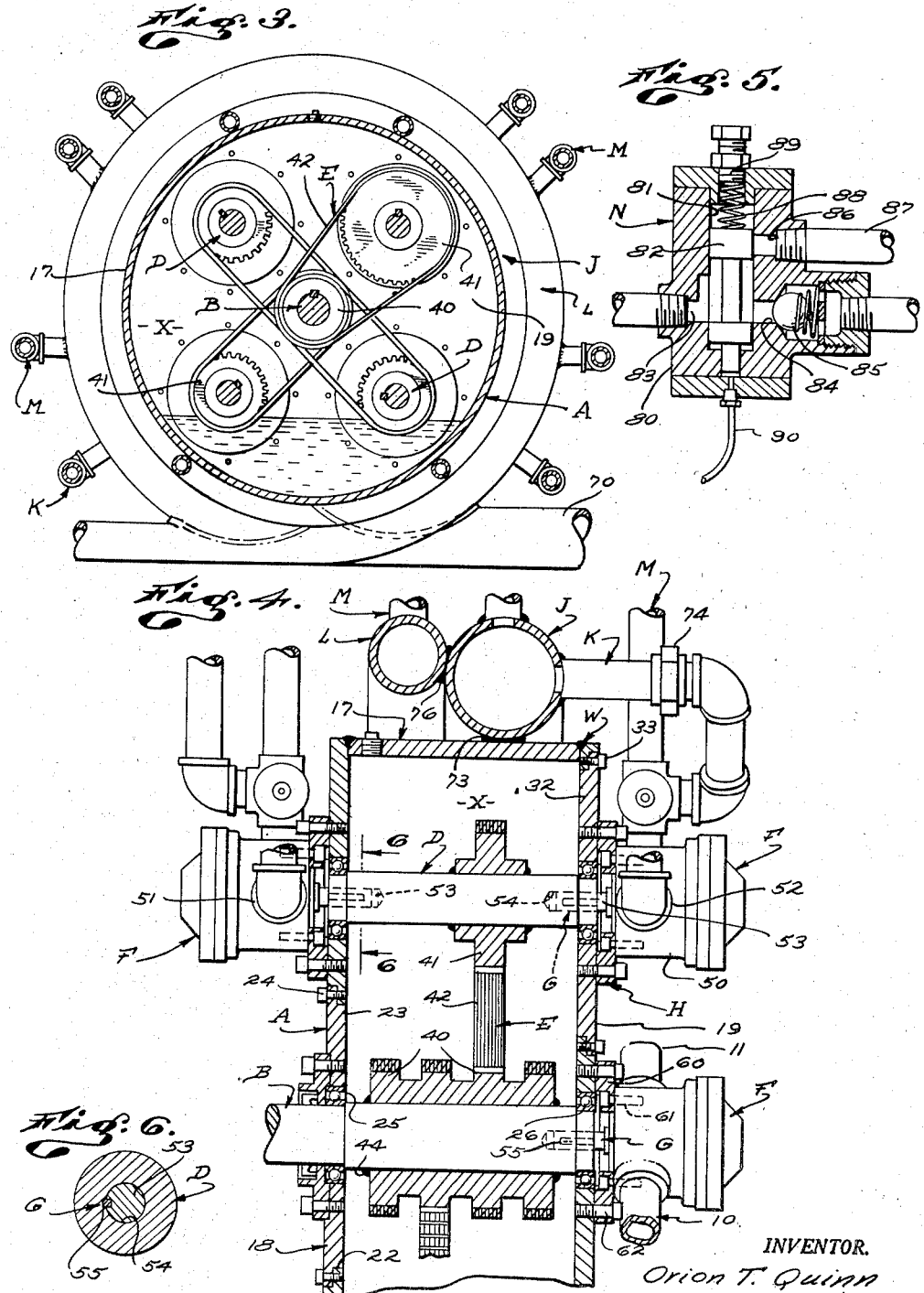

Jan. 18, 1955   O. T. QUINN   2,699,726
POWER DRIVE FOR PUMPS
Filed April 23, 1952   3 Sheets-Sheet 3

INVENTOR.
Orion T. Quinn
BY
Attorney

United States Patent Office 2,699,726
Patented Jan. 18, 1955

2,699,726

POWER DRIVE FOR PUMPS

Orion T. Quinn, Bell, Calif., assignor to Orion T. Quinn, Jr., Montebello County, Calif.

Application April 23, 1952, Serial No. 283,919

24 Claims. (Cl. 103—4)

This invention relates to a power drive for pumps and it is a general object of the invention to provide a simple, practical machine adapted to be operated by a prime mover, and which includes a plurality of pumps driven so that they operate simultaneously and which is such that the pumps can be individually removed or replaced or possibly eliminated without material disturbance of other parts or elements of the structure.

It is an object of this invention to provide a machine wherein shafts are provided and are driven simultaneously, each shaft having its ends accessible and serving to drive pumps so that each shaft drives two pumps.

Another object of this invention is to provide a mechanism of the general character referred to wherein there is a main drive shaft and sub-shafts, with drive means from the main shaft to the sub-shafts including individual drives to the several sub-shafts.

It is another object of this invention to provide a structure of the general character referred to including a simple, compact arrangement of essential elements including a housing, pumps, and fluid handling manifolds.

It is another object of the invention to provide a mechanism of the general character referred to wherein there is a housing of simple, inexpensive construction with end walls each apertured and involving detachable sections by which drive elements are adapted to be arranged in or removed from the housing, as circumstances require. Another object of the invention is to provide a mechanism of the general character referred to wherein pumps may be advantageously related to operate in various manner, as for example, so they deliver fluid at different pressures with a common manifold or so they operate in series, one adding to the pressure delivered by another.

The mechanism provided by this invention is adapted to be driven by a motor, or the like, and it includes a power distributing means characterized by a housing, a main shaft extending into the housing, sub-shafts carried by the housing, and drive means whereby the sub-shafts are operated from the main shaft. The main shaft is coupled to the motor and it is preferred that the motor and housing be supported by a common base. One wall of the housing has a large aperture passing the main shaft, and a detachable section of such wall carries a bearing supporting the main shaft. The opposite wall of the housing has apertures corresponding to the sub-shafts and each is closed by a detachable section of that wall forming a bearing carrier. Drive means in the housing includes drive elements on the main shaft insertable into the housing through the opening in the first mentioned wall, driven elements on the sub-shafts insertable through the openings in the other or opposite wall, and flexible drivers or chains connecting the drive and driven elements.

A plurality of pumps occurs at the exterior of the housing and such pumps may, for example, be typical gear pumps with projecting shafts. The shafts of the pumps are releasably coupled with the ends of the shafts above mentioned, and a mounting means is provided securing each pump to the exterior of the housing so that it is readily detachable therefrom.

In one arrangement a supply manifold is provided to supply fluid to the pumps and inlet ducts connect the supply manifold and inlets of the several pumps. A delivery manifold is provided and outlet ducts extend from the pumps to the delivery manifold. A regulating means is provided in connection with each pump delivering fluid to the delivery manifold and may include a relief valve serving to bleed pumped fluid. The manifolds are preferably annular and surround the housing to be at the periphery thereof. If desired one or more pumps may be independent of the manifolds hereinabove described, and if desired the pumps may be operated at different speeds or all at the same speed, as circumstances require.

In another arrangement a group of the pumps, for example, those at one end or side of the housing are coupled in series so that pressure is built up as a stream of fluid is circulated through the series of pumps.

Figure 2:
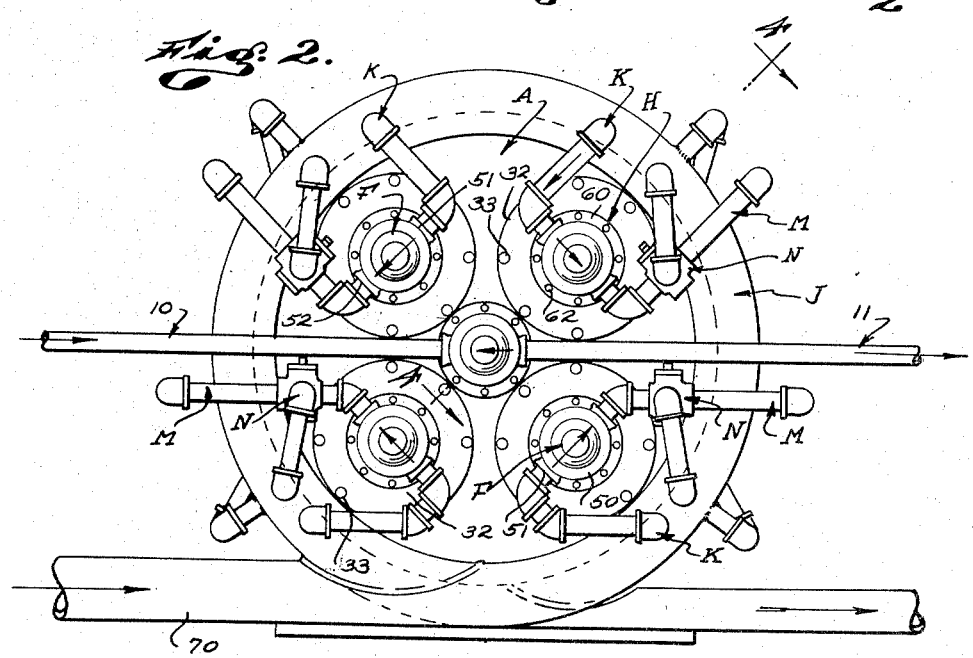
Figure 7:
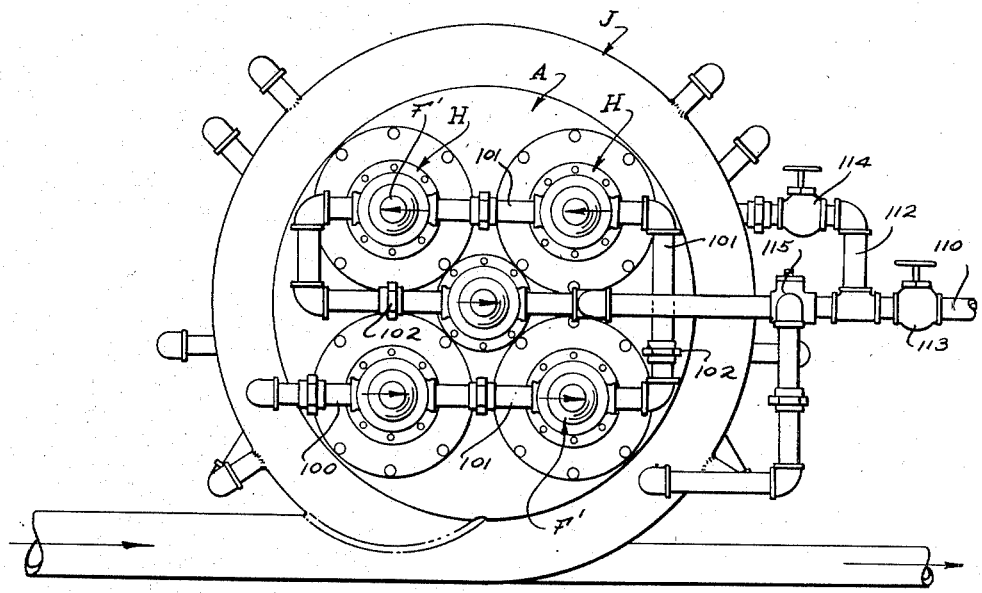
Figure 8:
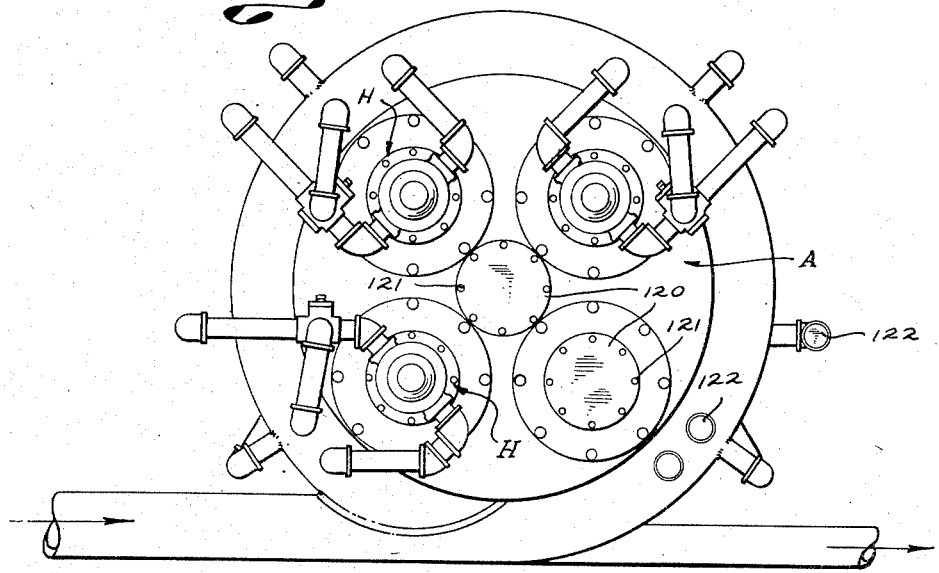

The various objects and features of my invention will be fully understood from the following detailed description of typical preferred forms and applications of the invention, throughout which description reference is made to the accompanying drawings, in which:

Fig. 1 is a side elevation of apparatus embodying the invention, showing a typical embodiment of the invention driven by a motor. Fig. 2 is an end elevation of structure shown in Fig. 1, being a view taken as indicated by line 2—2 on Fig. 1. Fig. 3 is a transverse, sectional view taken as indicated by line 3—3 on Fig. 1. Fig. 4 is an enlarged, detailed, sectional view of a portion of the mechanism shown in Fig. 2, being a view taken as indicated by line 4—4 on Fig. 2. Fig. 5 is an enlarged, detailed, sectional view of a regulating means employed in the structure. Fig. 6 is an enlarged, sectional view taken as indicated by line 6—6 on Fig. 4. Fig. 7 is an end elevation of another form of the invention, and Fig. 8 is an end elevation of the apparatus illustrated in Fig. 2 but showing two pumps removed and replaced by closure plates.

The present invention provides structure adapted to be operated from a source of power such as a prime mover, and in the drawings the mechanism is shown driven by a motor M'. The invention provides, generally, a power distributing means which includes a housing A, a main drive shaft B, sub-shafts D and drive means connecting shafts B and D and preferably including an individual drive E from the main shaft B to each sub-shaft D. The invention further provides a plurality of pumps F located at the exterior of the housing A, drive means G coupling pumps F with shafts carried by the housing A, mounting means H detachably mounting the pumps on the exterior of the housing A. In the case illustrated in Figs. 1 to 6 there is a supply manifold J, an inlet duct K connecting each pump of a series of pumps with the manifold J, a delivery manifold L, an outlet duct M from each pump in the series and connected to manifold L, a control means N for each pump thus coupled with the delivery manifold, and various other features as will be hereinafter described. The pumps in this series may include part or all of the pumps at both sides of the housing.

In carrying out the invention the pumps F may be connected in various ways in one or more series, or they may be independent. In the case illustrated in Figs. 1 to 6, one pump, namely the pump coupled to and driven by the main shaft B, is entirely independent of the other pumps, insofar as its fluid connections are concerned, and it is adapted to be supplied with fluid by means of a supply line 10 and it is adapted to deliver fluid under pressure to a line 11. The several other pumps are all connected in a common group or series, and each is supplied from manifold J and delivers fluid to manifold L.

In the structure illustrated in the drawings the motor M' is carried by a base 15 which supports a bracket 16 carrying the housing A. The housing A includes a cylindrical body 17, an inner end wall 18, and an outer end wall 19. The walls 18 and 19 are shown fixed to the ends of the cylindrical body as by welding W and the housing forms a chamber X adapted to carry various elements of the mechanism and to carry a suitable supply of lubricant, as illustrated in Fig. 3 of the drawings.

In accordance with the present invention the main shaft B is joined to the motor shaft 20 by a coupling 21 and it extends into the housing A through the rear wall 18 centrally of the housing. In the preferred construction the rear wall 18 of housing A has a central opening 22 of substantial size, normally closed by a section 23 of wall 18 detachably maintained in position by means of fasteners 24 which may be screws, or the like. The section 23 has a central opening carrying a suitable anti-friction bearing 25 which supports the shaft B as it enters the housing. The terminal end portion of the shaft B is carried by an anti-friction bearing 26 supported by wall 19 centrally of the housing, as clearly illustrated in the drawings.

In accordance with the invention the several sub-shafts D are spaced apart and are arranged in an annular series surrounding shaft B. In the preferred construction one end of each sub-shaft D is carried by an anti-friction bearing 30 mounted in an opening in the rear wall 23, while the other end is supported in an anti-friction bearing 31 carried in an opening provided in a section 32 of the front wall 19 releasably held by fasteners 33 such as screws, or the like.

In accordance with the invention the drive E from shaft B to each sub-shaft D involves a drive element such as a drive sprocket 40 on shaft B, a driven element such as a sprocket 41 on the sub-shaft, and a driving element such as a chain 42 connecting the sprockets. In the particular case illustrated there is a separate or independent drive sprocket 40 for each sub-shaft and the several drive sprockets are assembled together as a unit and fixed on shaft B as by welding 44.

In accordance with the present invention the opening 22 in the rear wall 18 of housing A is of such size as to freely accommodate the drive sprockets 40 and the openings in the front wall 19 closed by the sections 32 are of such size as to freely pass the driven sprockets on the sub-shafts D. By employing belt or chain drives between the shaft B and each of the sub-shafts it is simple to obtain any desired drive or speed ratio between the main shaft and the sub-shafts. For instance, as shown in Fig. 3 of the drawings, several of the sub-shafts may be driven at the same speed, whereas another may be driven at a materially different speed. In Fig. 3 it is to be noted that the driven sprocket at the upper righthand corner is considerably larger than the other driven sprockets, with the result that the sub-shaft carrying that driven sprocket will be operated more slowly than the others. Further, with individual drives, one or more of the flexible elements or chains can be removed, if desired, thus completely disconnecting one or more of the sub-shafts, without disturbing the drives to the other sub-shafts.

The present invention provides pumps F at the exterior of housing A and it is a feature of the invention that pumps F occur at both sides of the housing, that is, some at the exterior of the rear wall 18 and some at the exterior of the front wall 19. If desired there may be a pump F at each end of each sub-shaft D, and there may be a pump at the terminal end of the main shaft B. It is to be understood that if desired any one or more of the pumps may be removed or eliminated, as circumstances require.

In accordance with the present invention the pumps F may vary widely in form, type, or character, and for purpose of example they may be considered as typical or conventional gear type pumps, each with a case 50, an inlet fitting 51, an outlet fitting 52, and a shaft 53. The drive means G provided for each pump F is through the shaft 53 of the pump, and in the case illustrated each pump shaft is slidably received in a central socket 54 entering the end of a shaft D or the end of shaft B, and a key 55 provides the desired drive.

The mounting means H, provided to support each pump F, preferably includes a mounting plate 60 to which the pump case 50 is fixed, as by means of fasteners 61. The plate 60 projects from the case 50 and is releasably secured to housing A by fasteners 62. The several pumps F arranged in or adjacent the rear wall 18 are mounted by the plates 60 being releasably secured directly to the wall 18, which is permanently rigid with body 17, whereas the several pumps F adjacent the front wall 19 to be driven by sub-shafts D have their mounting plates 60 secured to sections 32 of wall 19.

In accordance with the broader principles of the present invention the pumps F may be coupled or arranged to operate individually or separately from one another, or some or all may be grouped, as circumstances require. In the case illustrated in Figs. 1 to 6 the one pump F arranged and coupled to be driven directly by the main shaft B is arranged to be independent of all of the other pumps and it simply serves to receive fluid from line 10 and to deliver it under pressure to line 11. The several other pumps F are all connected in a common or single series or group, so that each pump in that group receives fluid from manifold J and delivers fluid to manifold L.

The manifold J is a supply manifold adapted to be fed with fluid from a supply line 70, and in accordance with the present invention it is preferably annular in form and surrounds the housing A to be at and arranged to project from the peripheral portion or body 17 of housing A. The manifold J is preferably located on the exterior of body 17 and it may be fixed thereto as by welding 73.

An inlet pipe K is provided for each pump of the group and extends from manifold J to the inlet fitting 51 of the pump. Each inlet pipe is preferably provided with a releasable coupling 74.

The delivery manifold L is adapted to receive fluid from each pump of the group and is preferably an annular manifold surrounding the body 17 of the housing A and, as shown in the drawings, it may be arranged adjacent to or in side by side relationship with manifold J, and in such case it may be fixed to manifold J as by welding 76, or the like. An outlet duct from each pump F of the said group of pumps extends from the pump to the manifold L and preferably includes a releasable coupling 77. The ducts coupled with each pump being provided with releasable couplings make it possible to easily and quickly detach a pump, or the ducts related thereto, as circumstances may require, and it is to be understood that if the couplings are released and the pumps removed, plugs or closures can be provided in connection with the parts of the ducts fixed to the manifolds, as circumstances require.

The control means N is preferably provided in connection with each pump F in the said group of pumps, and in a typical example the several control means N may be set or regulated so that the pumps of the group deliver fluid to the delivery manifold up to certain predetermined pressures, to the end that all of the pumps deliver fluid in full volume at a low pressure, whereas only one pump delivers fluid to the delivery manifold at maximum pressure.

In practice any suitable pressure relief type of device can be employed for means N. In Fig. 5 a typical construction is disclosed, wherein a means N in an outlet duct from a pump F includes a body 80 with a cylindrical opening 81 carrying a valve element 82. An inlet port 83 is provided, receiving fluid under pressure from the pump and a delivery port 84 is provided receiving fluid and passing it to the delivery manifold past a check valve 85. A bleed port 86 is provided to pass fluid to a bleed line 87 that connects to the supply manifold J. A spring 88, subject to adjustment by means of a screw 89, normally yieldingly holds the valve 82 in position where fluid passes from port 83 to port 84. A control or pilot connection 90 is provided from the delivery manifold to one end of the cylinder 81 and as pressure builds up in the delivery manifold L the valve 82 tends to move against the resistance of spring 88. When the pressure supplied through the pilot line 90 approaches a predetermined value the valve 82 is moved and gradually closes port 84, and when such predetermined value is reached port 84 is closed and port 86 is opened.

With the construction and arrangement provided by the present invention a very substantial number of pumps may be incorporated in the mechanism to be driven simultaneously, and these pumps can be driven at suitable speeds and, if repairs or replacements are required, individual pumps can be removed or replaced without disturbing other parts of the apparatus. Furthermore, by providing the control means N adjusted to successively cut out the supply from the pumps F to the delivery manifold, a substantially uniform power load may be maintained on the motor M', and when fluid is being delivered at a low pressure and at a substantial volume, the several pumps may operate simultaneously to deliver fluid to the delivery manifold. As the pressure increases and the load becomes greater the pumps will cut out, one by one or one after another, until finally, when a maximum pressure has developed in the delivery manifold, but one pump may be operating to deliver fluid, while fluid from all of the other pumps is bled through the controls as hereinabove described.

In the form of the invention illustrated in Fig. 7, the pumps at one end of the housing are in a group or series somewhat different from that hereinabove described. In this case several of the pumps, in the case illustrated, all of those at the outer end of the housing A, are connected together in a series so that the first pump of the series delivers fluid at a low pressure, and as the pumps progress in the series they add pressure until the last pump in the series delivers the fluid at a very substantial pressure. Such a series arrangement can, of course, include all of the pumps, that is, those at both ends of the housing or as shown in Fig. 7 the series may include only those at one end of the housing in which case those at the other end of the housing may be in a series such as was first described.

In the particular case illustrated the pumps F' located at the outer side or end of the housing A are all coupled in the series and the first pump of the series is supplied with fluid as through or by means of a suitable inlet duct 100. Where the structure includes an inlet or supply manifold J, the duct 100 may receive fluid from that manifold. Connecting ducts 101 connect adjacent pumps of the series and each of these connecting ducts preferably includes a releasable connection or union 102. In a preferred arrangement where the series of pumps is at the outer end of the housing A, the last pump of the series, that is, the one delivering the fluid at the highest pressure is preferably the one at the center of the structure and driven by the main shaft B.

In a typical arrangement the series of pumps as shown in Fig. 7 may deliver the fluid to a line 110, and if desired a duct or connection 112 may be provided so that the fluid from the series is delivered to the manifold L when such a manifold is included in the construction.

In the arrangement illustrated a control valve 113 is provided in line 110 and a control valve 114 is provided in the connection or line 112 so that the fluid from the series of pumps can be delivered either to line 110 or to manifold L as circumstances may require. Further, in the case illustrated, a pressure relief valve 115 is provided in the outlet from the last pump of the series, and when the pressure delivered by the series exceeds a pre-determined value the pressure relief valve 115 opens and returns or by-passes part of the fluid to the supply line or supply manifold J.

In Fig. 8 of the drawings there is illustrated an arrangement such as is shown in Fig. 2 except that certain of the pumps are removed, and closure plates 120 are applied. The plates 120 may be held by screw fasteners 121, or the like, and in practice may be simple, flat, imperforate plates such as are illustrated in the drawing. When pumps are removed the lines or ducts related to them may be closed as by caps or plugs 122.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a housing including a body and substantially parallel end walls closing the body, a main shaft entering and carried by the housing, sub-shafts carried by the housing between the end walls thereof, drive means operating the sub-shafts from the main shaft, and pumps at the exteriors of the end walls projecting in opposite directions from the housing and driven by the said shafts.

2. In combination, a housing including a body and substantially parallel end walls closing the body, a main shaft entering and carried by the housing through one end wall of the body, sub-shafts carried by the housing between end walls, drive means in the body operating the sub-shafts from the main shaft, and pumps at the exteriors of both of the end walls and driven by the said shafts, there being a pump at the exterior of the other end wall and driven by the main shaft and two pumps driven by a sub-shaft.

3. In combination, a housing including a body and end walls at opposite ends of the body and closing the body, a main shaft entering and carried by the housing, sub-shafts carried by the housing between the end walls, drive means in the body operating the sub-shafts from the main shaft, and pumps at the exteriors of both of the end walls and driven by the said shafts, there being two pumps driven by each sub-shaft.

4. In combination, a housing including a body and end walls closing the body at both ends thereof, a main shaft entering and carried by the housing, sub-shafts carried by the housing, drive means in the housing operating the sub-shafts from the main shaft, and pumps at the exteriors of both of the end walls driven by the sub-shafts.

5. In combination, a housing including a body and oppositely facing end walls closing the body, a main shaft entering and carried by the housing, sub-shafts carried by the housing between said end walls, drive means in the body operating the sub-shafts from the main shaft and including an individual drive from the main shaft to each sub-shaft, and pumps at the exteriors of the two end walls and driven by the said shafts.

6. In combination, a housing including a body and oppositely facing end walls closing the body, a main shaft entering and carried by the housing, sub-shafts carried by the housing within the body and between the end walls, drive means in the body operating the sub-shafts from the main shaft and including an individual, flexible drive from the main shaft to each sub-shaft, and pumps at the exteriors of the end walls projecting in opposite directions from the body and driven by the said shafts.

7. In combination, a housing including a body and oppositely facing end walls closing the body, a main shaft entering and carried by the housing, sub-shafts carried by the housing between said end walls, drive means in the body operating the sub-shafts from the main shaft and including an individual drive from the main shaft to each sub-shaft, and pumps at the exterior of the housing projecting in opposite directions therefrom and driven by shafts carried by the housing.

8. In combination, a housing having a body closed by spaced oppositely facing inner and outer walls, the inner wall having an opening closed by a detachable section of that wall and the outer wall having openings closed by detachable sections of the outer wall, a main shaft entering the housing through the said section of the inner wall, sub-shafts carried by the inner wall and by said sections of the outer wall, drive means from the main shaft to the sub-shafts, and pumps at the exterior of the housing at the outer sides of the inner and outer walls and driven by the sub-shafts, the said drive means including elements removable from the housing through the said openings.

9. In combination, a housing having a body closed by inner and outer walls, the inner wall having an opening closed by a detachable section of that wall and the outer wall having openings closed by detachable sections of the outer wall, a main shaft entering the housing through the said section of the inner wall, sub-shafts carried by the inner wall and by said sections of the outer wall, drive means from the main shaft to the sub-shafts, and pumps at the exterior of the housing at the outer sides of the inner and outer walls and driven by the sub-shafts, the said drive means including drive elements on the main shaft removable through the opening in the inner wall and driven elements on the sub-shafts removable through the openings in the outer wall.

10. In combination, a housing having a body closed by inner and outer walls, the inner wall having an opening closed by a detachable section of that wall and the outer wall having openings closed by detachable sections of the outer wall, a main shaft entering the housing through the said section of the inner wall, sub-shafts carried by the inner wall and by said sections of the outer wall, drive means from the main shaft to the sub-shafts, a plurality of pumps at the outer side of each of said walls of the body, a releasable drive from a sub-shaft to each pump, and means detachably mounting each pump on the exterior of the housing, the said drive means including elements removable from the housing through the said openings.

11. In combination, a housing including a body and oppositely facing end walls closing the body, a main shaft entering and carried by the housing, sub-shafts carried by the housing between said end walls, drive means in the body operating the sub-shafts from the main shaft, a pump at the exterior of the housing driven directly by the main shaft, pumps at the exterior of the housing at each end thereof and at the outer sides of the end walls, and means at the exterior of the body coupling a group of the pumps together to receive fluid from a single supply and deliver it to a single outlet.

12. In combination, a housing including a body and oppositely facing end walls closing the body, a main shaft entering and carried by the housing, sub-shafts carried by the housing between said end walls, drive means in the body operating the sub-shafts from the main shaft, a pump at the exterior of the housing in line with and driven by the main shaft, pumps at the exterior of the housing at each end thereof and at the outer sides of the end walls driven by the sub-shafts, and means at the exterior of the body coupling the pumps driven by the sub-shafts by a common inlet manifold and a common delivery manifold.

13. In combination, a housing including a body and oppositely facing end walls closing the body, a main shaft entering and carried by the housing, sub-shafts carried by the housing between said end walls, drive means in the housing operating the sub-shafts from the main shaft, a pump at the exterior of the housing in line with and driven by the main shaft, pumps at the exterior of the housing at each end thereof and projecting from the outer sides of said end walls and driven by the sub-shafts, and means at the exterior of the housing coupling the pumps driven by the sub-shafts by a common inlet manifold and a common delivery manifold, each pump driven by a sub-shaft having inlet and outlet ducts with releasable coupling therein.

14. In combination, a housing including a body and oppositely facing end walls closing the body, a main shaft entering and carried by the housing, sub-shafts carried by the housing between said end walls, drive means between the end walls and within the body operating the sub-shafts from the main shafts, pumps driven by the shafts carried by the housing at the outer sides of the end walls, a supply manifold adjacent the exterior of the body of the housing, a delivery manifold adjacent the exterior of the body of the housing, and inlet and outlet ducts connecting said pumps and the manifolds.

15. In combination, a housing including a body and oppositely facing end walls closing the body, a main shaft entering and carried by the housing, sub-shafts carried by the housing between the end walls, drive means within the body between the end walls operating the sub-shafts from the main shafts, pumps driven by the shafts carried by the housing, a supply manifold adjacent the body of the housing, a delivery manifold adjacent the body of the housing, and inlet and outlet ducts connecting said pumps and the manifolds, both of the manifolds being annular and surrounding the housing.

16. In combination, a housing including a body and oppositely facing end walls closing the body, a main shaft entering and carried by the housing, sub-shafts carried by the housing between the end walls, drive means in the housing operating the sub-shafts from the main shaft, a pump at the exterior of the housing at the outer side of one end wall and driven by the main shaft, pumps at the exterior of the housing at the outer side of each end wall, and means coupling a group of the pumps together in a series adapted to receive fluid from an inlet duct and to deliver it to an outlet duct, the outlet of one pump being connected to the inlet of the next pump in the series, the first pump of the series having its inlet connected to a fluid supply and the outlet of the last pump of the series being connected to a fluid conductor whereby each pump in the series adds pressure to fluid as it advances through the series.

17. In combination, a housing including a body and oppositely facing end walls closing the body, a main shaft entering and carried by the housing, sub-shafts carried by the housing between the end walls, drive means in the housing operating the sub-shafts from the main shaft, a pump at the exterior of the housing in line with and driven by the main shaft, pumps at the exterior of the housing at each end thereof and at the outer sides of the end walls, and means coupling a group of the pumps together to operate in parallel with each pump receiving fluid directly from a fluid supply and delivering fluid to a common fluid receiver.

18. In combination, a housing including a body and oppositely facing end walls closing the body, a main shaft entering and carried by the housing, sub-shafts carried by the housing between said end walls, drive means in the housing operating the sub-shafts from the main shaft, a pump at the exterior of the housing in line with and driven by the main shaft, pumps at the exterior of the housing at each end thereof and at the outer sides of the end walls, and means coupling a group of the pumps together in a series adapted to receive fluid from an inlet duct and to deliver it to an outlet duct, each pump in the series adding pressure to fluid as it advances through the series, the outlet of one pump of said series being connected to the inlet of the next pump of said series, the inlet of the first pump in the series being connected to the inlet duct and the outlet of the last pump in the series being connected to the outlet duct, and means coupling a group of the pumps together to operate in parallel with each pump receiving fluid directly from a fluid supply and delivering fluid to a common fluid receiver.

19. In combination, a housing including a body and oppositely facing end walls closing the body, a main shaft entering and carried by the housing, sub-shafts carried by the housing between the end walls, drive means in the housing operating the sub-shafts from the main shaft, a pump at the exterior of the housing driven by the main shaft, pumps at the exterior of the housing at the outer side of each end wall, and means coupling a group of the pumps together in a series adapted to receive fluid from an inlet duct and to deliver it to an outlet duct, each pump in the series adding pressure to fluid as it advances through the series, the outlet of one pump of said series being connected to the inlet of the next pump of said series, the inlet of the first pump in the series being connected to the inlet duct and the outlet of the last pump in the series being connected to the outlet duct, the last pump of the series being coupled to the main shaft and the other pumps of the series being coupled to the sub-shafts.

20. In combination, a housing including a body and oppositely facing end walls closing the body, one of the walls having a removable section, a main shaft entering and carried by the housing, sub-shafts carried by the housing between said end walls, drive means in the body operating the sub-shafts from the main shaft, and pumps at the exteriors of the end walls projecting therefrom and driven by the said shafts, one pump being carried by said section.

21. In combination, a drum shaped housing, a plurality of shafts carried by the housing and adapted to operate simultaneously, a plurality of pumps at one end of the housing and each in driving engagement with one of the shafts, each pump being adapted to receive fluid and to deliver such fluid under pressure, an annular fluid handling manifold concentric with and adjacent the housing, and fluid handling ducts connecting the pumps and the manifold.

22. In combination, a drum shaped housing, a plurality of shafts carried by the housing and adapted to operate simultaneously, a plurality of pumps at one end of the housing and each in driving engagement with one of the shafts, two annular fluid handling manifolds concentric with each other and concentric with and adjacent the housing, inlet ducts connecting the pumps and one of the manifolds, and outlet ducts connecting the pumps and the other manifold.

23. In combination, a drum shaped housing, a plurality of shafts carried by the housing and adapted to operate simultaneously, a plurality of pumps at one end of the housing and each in driving engagement with one of the shafts, each pump being adapted to receive fluid and to deliver such fluid under pressure, an annular fluid handling manifold concentric with and adjacent the housing, and fluid handling ducts connecting the pumps and the manifold, the manifold being larger in diameter than the housing and surrounding the housing adjacent the periphery thereof.

24. In combination, a drum shaped housing, a plurality of shafts carried by the housing and adapted to operate simultaneously, a plurality of pumps at one end of the housing and each in driving engagement with one of the shafts, two annular fluid handling manifolds concentric with each other and concentric with and adjacent the housing, inlet ducts connecting the pumps and one of the manifolds, and outlet ducts connecting the pumps and the other manifold, the manifolds being larger in diameter than the housing and surrounding the housing adjacent the periphery thereof.

(References on following page)

References Cited in the file of this patent

UNITED STATES PATENTS

| Number | Name | Date |
|---|---|---|
| 270,671 | Huffer | Jan. 16, 1883 |
| 1,879,219 | Harbison | Sept. 27, 1932 |
| 2,146,123 | Logan | Feb. 7, 1939 |
| 2,188,848 | Svenson | Jan. 30, 1940 |
| 2,256,743 | Kleekner | Sept. 23, 1941 |
| 2,354,992 | Gottlieb | Aug. 1, 1944 |
| 2,432,825 | Sloane | Dec. 16, 1947 |
| 2,481,047 | Sloane | Sept. 6, 1949 |

FOREIGN PATENTS

| Number | Country | Date |
|---|---|---|
| 364,631 | Great Britain | Jan. 4, 1932 |